UNITED STATES PATENT OFFICE.

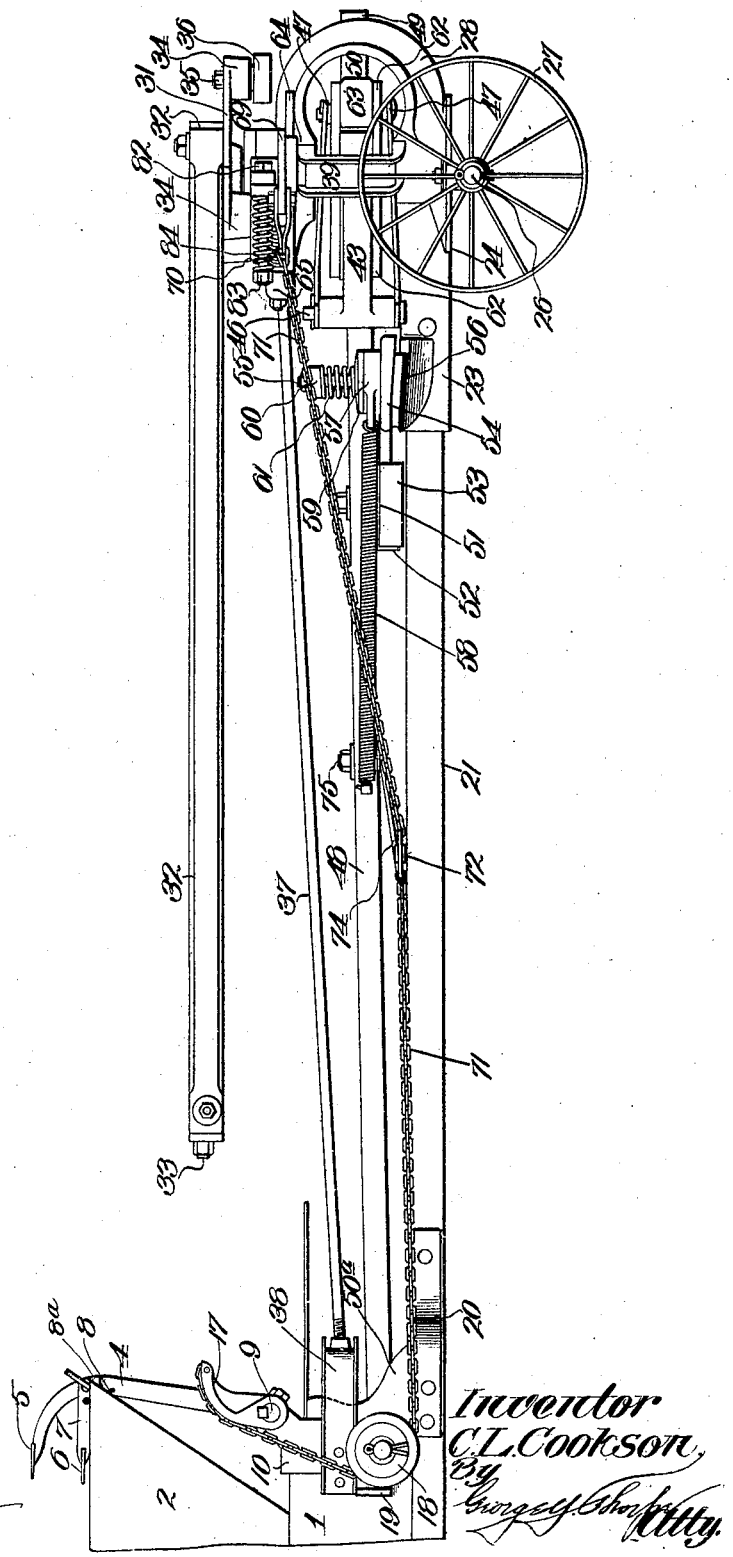

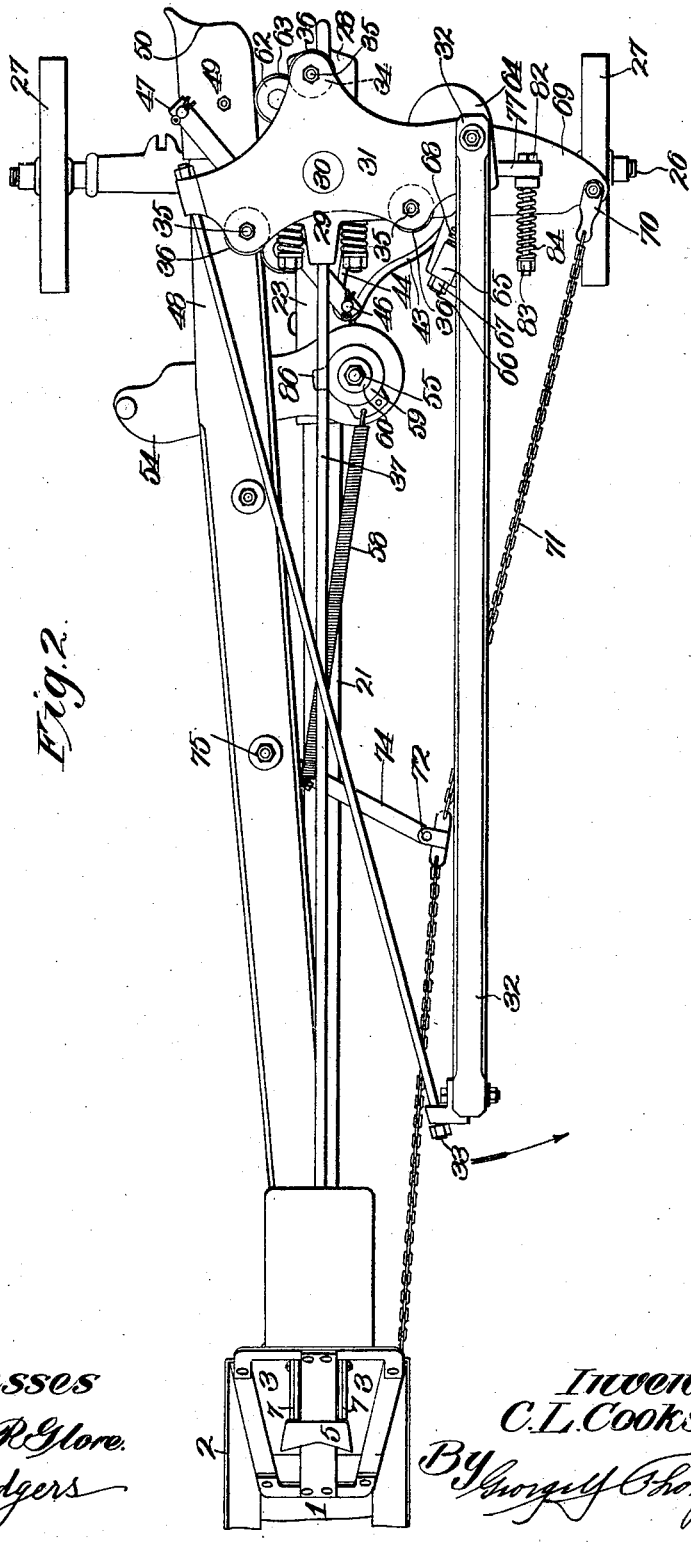

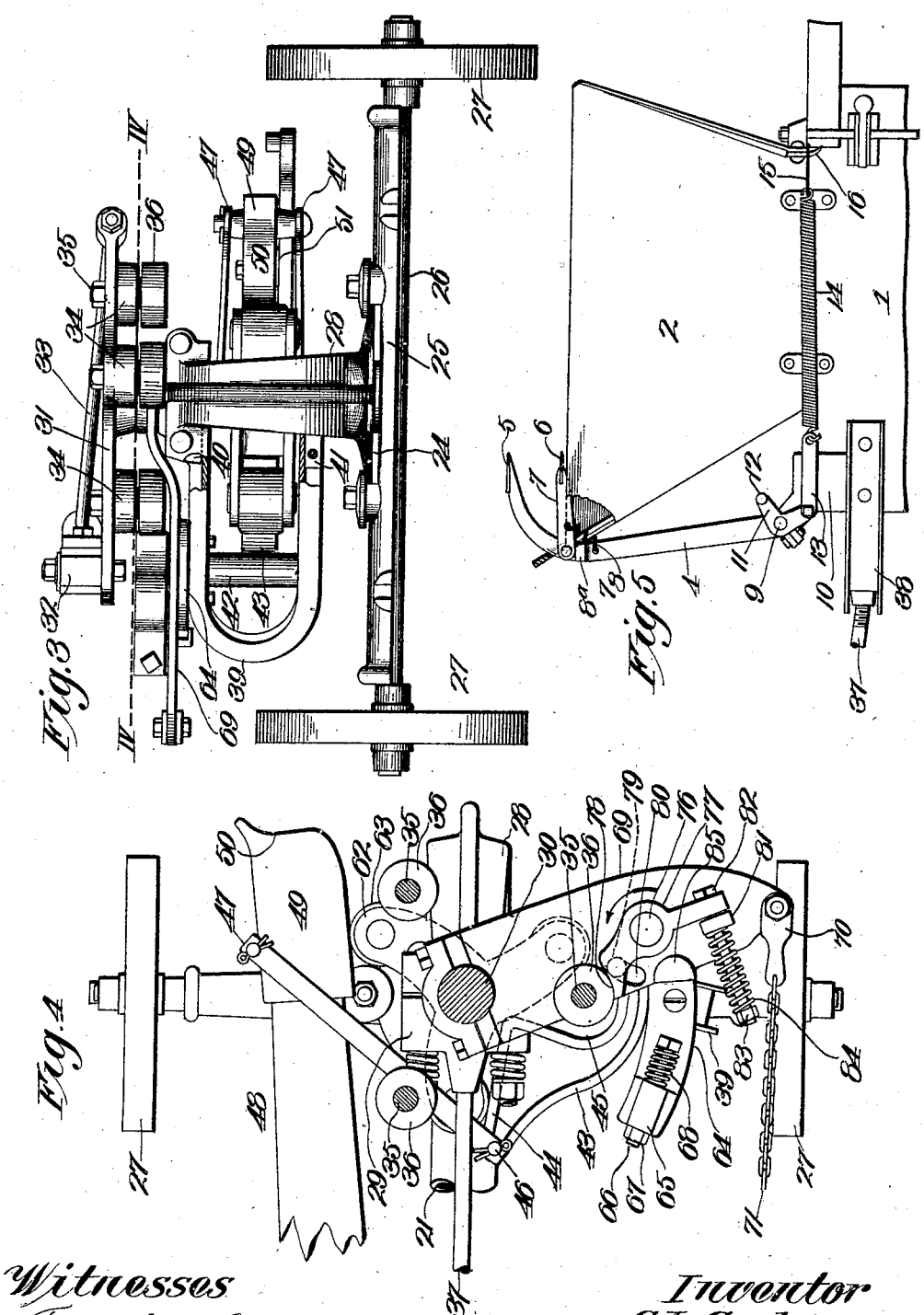

CHARLES L. COOKSON, OF KANSAS CITY, MISSOURI, ASSIGNOR TO PANAMA HAY PRESS CO., OF KANSAS CITY, MISSOURI, A CORPORATION OF MISSOURI.

BALING-PRESS.

No. 877,173.              Specification of Letters Patent.           Patented Jan. 21, 1908.

Application filed March 18, 1907. Serial No. 362,833.

*To all whom it may concern:*

Be it known that I, CHARLES L. COOKSON, a citizen of the United States, residing at Kansas City, in the county of Jackson and State of Missouri, have invented certain new and useful Improvements in Baling-Presses, of which the following is a specification.

This invention relates to baling presses and more especially to that type in which the plunger makes three strokes to one revolution of the sweep, and my object is to produce a machine of this character which operates efficiently and reliably.

A further object is to produce a machine of this character equipped with an efficient and reliable feeder for forcing the hay down into the baling chamber in advance of the plunger and before each stroke thereof.

With these objects in view the invention consists in certain novel and peculiar features of construction and organization as hereinafter described and claimed; and in order that it may be fully understood reference is to be had to the accompanying drawings, in which—

Figure 1, is a side view of a baling press embodying my invention, the parts being broken away through the baling chamber. Fig. 2, is a top plan view of the same. Fig. 3, is an enlarged front view of the same. Fig. 4, is a horizontal section taken on the line IV—IV of Fig. 3 but with the plunger and coöperating parts in a different position from that shown in Fig. 2. Fig. 5, is an enlarged view of a part of the opposite side of the baling case from that shown in Fig. 1 with the hopper broken away.

In the said drawings, 1 indicates the baling case and 2 the hopper thereof with its front wall provided with a pair of slots 3 through which extend the feeder arms 4, said arms being equipped with a feeder plate 5 at their upper ends. An auxiliary feeder plate 6 connects a pair of arms 7 pivoted to arms 4 and retractile springs 8 connect said arms for the purpose of holding arms 7 yieldingly against stop lugs 8ª on arms 4. The feeder arms 4 are secured to a rock shaft 9 journaled in bearing brackets 10 secured to the baling case and on one end of said shaft is secured a bell crank lever 11 having one arm equipped with an outwardly projecting pin 12, and its other arm pivotally connected by a link 13 to a retractile spring 14 connected in turn to the link 15 secured on a hook 16, carried by the case. Spring 14 is for the purpose of elevating the feeder to the position shown. Pin 12 when the feeder goes down depresses the rear end of link 13 so that when spring 14 retracts it presses upward against said pin and starts the elevation of the feeder, the pull of the spring on the arm of the bell crank to which it is pivoted, continuing such movement of the feeder until it attains the position shown in the drawings. Secured rigidly on the opposite end of shaft 9 is a cam-shaped crank arm 17 and below such arm the baling case is equipped with a guide pulley 18 and back of the latter with a guard 19 for a purpose which hereinafter appears.

20 are brackets connecting the front end of the baling case with rod 21 secured at its front end to the extension 23 of a base plate 24 mounted on a semi-cylindrical sleeve 25 secured rigidly on the front axle 26 equipped with the customary wheels 27.

28 is a goose neck forming a part of the base plate 24 and in conjunction with cap 29 secured to it in the usual manner, forms a bearing for the upper end of the power shaft 30, which shaft as usual in this class of machinery, is journaled at its lower end in the base plate. Secured rigidly to the upper end of the power shaft is a sweep head 31 to which the sweep 32 is secured and from it said sweep is braced by rod 33. At equidistant points with respect to each other and to the axis of the power shaft the sweep head is provided with depending bosses 34 through which extend bolts 35 on which are journaled rollers 36, said rollers being adapted to travel in a circular direction around the axis of the power shaft and in a horizontal plane just above the goose neck.

37 is a tie rod secured in the usual manner to bearing cap 29 and to the yoke 38 secured to the baling case.

39 is a channel iron yoke arranged at one side of the power shaft and bolted or otherwise rigidly secured to lugs 40 and 41 projecting laterally from the upper and lower portions of the goose neck, and pivoted in said yoke 39 as at 42 to swing horizontally, is a swing arm 43 having a tread surface 44 and a pocket 45 forward of the tread surface. Pivoted as at 46 to the free end of said swing arm is a pair of links 47, their opposite ends being pivoted to the head of the pitman 48, the head being preferably of metal as at 49 and provided at its front end with the usual pocket 50. At its rear end the pitman is provided with the usual or any preferred plunger 50ª and at its underside with a longitudinally extending wear plate 51 terminating at its rear end in a shoulder 52 to provide a brace for the block 53 secured to the pitman at its underside and adapted upon the recoil of the pitman to strike the brake plate 54 which also forms a support or rest for the front end of the pitman and is pivoted on a vertical bolt 55 projecting rigidly upward from a boss 56 formed integral by preference with base extension 23, the meeting ends or faces of said boss and pivoted plate 54 being inclined for a purpose hereinafter mentioned.

57 is a collar upon the bolt 55 and plate 54, and 58 is a retractile spring connecting said collar with the pitman. 59 is a washer also upon the bolt and collar, 60 a nut engaging the bolt and 61 an expansive spring interposed between said nut and washer for the purpose of pressing collar 54 heavily against the boss 56. By this arrangement a gradually increasing resistance is offered to the recoil of the pitman for the purpose of reducing the shock or jar incident thereto, to the minimum.

62 indicates a triple-armed trip lever mounted rigidly on the power shaft in the horizontal plane of the pitman and provided with the customary anti-friction rollers 63.

64 is a table secured rigidly to and upon the yoke 39 and provided with a tubular portion 65 in which is slidingly fitted a bolt 66 engaged at the opposite end of the sleeve from its head by a retaining nut 67, an expansive coil spring 68 being mounted on the bolt and bearing at its opposite ends against its head and the front end of the tubular portion 65.

69 indicates a swing arm journaled on the power shaft as shown most clearly in Fig. 4 and resting near its outer end on the table 64, and pivotally connected to the outer end of said swing arm as at 70 is a chain 71 or its equivalent; said chain being secured at its rear end to the cam shaped crank 17, (see Fig. 1), and also extending around pulley 18 upon which it is reliably held by guard 19. At a suitable point chain 71 is pivotally connected as at 72 to the swinging link 74, said link being pivoted at its oppoiste end to the pitman 48.

Pivoted as at 76 to and at the upper side of swing arm 69 is a lever 77 having its end nearest the power shaft provided with a concave pocket 78 and a pin 79 depending through a slot 80 in the swing arm 69 said pin limiting the pivotal movement of said lever.

81 is an apertured lug projecting upward from swing arm 69 rearward of the outer end of the lever and 82 is a bolt secured to said outer end of the lever and extending through said apertured lug and provided at its rear end with a nut 83 and between said nut and apertured lug with an expansive coil spring 84, and inward of lug 81 the swing arm 69 is provided with a head 85 to strike against the bolt 66 as the feeder is returned to its elevated position.

The operation of the machine is as follows. As the sweep travels in the direction indicated by the arrow Fig. 2, the trip lever roller engaging the head of the pitman forces the latter outward, this movement being accompanied by a slight rearward movement induced by the swing of the links 47. At the same time one of the rollers 36 at the opposite side of the shaft from the said roller 63 is in engagement with the pocket 78 of the lever or trigger 77 and is moving forwardly, this forward movement, owing to the resistance of spring 84 being greater than that of spring 14, swinging the swing arm 69 forwardly and through the chain or flexible connection between the swing arm and the cam shaped crank 17, swinging the feeder down to force down into the baling chamber a charge of hay previously deposited into the hopper. The lateral movement above referred to, of the plunger ends simultaneously with the downward movement of the feeder and at about the same time the trip lever roller between the pitman and swing arm 43 comes into engagement with the tread surface 44 of the latter. The continued movement of the sweep after the feeder has attained its most depressed position and consequently after the limit of forward movement of the swing arm has been attained, results in the automatic release of the feeder, that is to say the pressure on the roller engaging the lever or trigger 77 causes the latter to swing in the direction indicated by the contiguous arrow, Fig. 4, the spring 84 yielding to permit such movement of the lever or trigger in order to permit the engaging roller 36 to roll off and forward of said trigger and permit the spring 84 to restore the trigger to its original position and at the same time permit spring 14 to reëlevate the feeder and swing the swing arm 69 back to its original position. As this return movement of the swing arm occurs with more or less force it is cushioned by the engagement of its head 85 striking against the spring-advanced slide bolt 66 as will be seen by reference to Fig. 4. As this release of the feeder is being automatically effected by the operation of its trigger the swing arm 43 is operated by the trip lever roller engaging it, the movement of the swing arm resulting in imposing an almost direct rearward pull on the pitman and before this pull is ended the feeder is tripped and is returned to its reelevated position. In this operative movement of the pitman the trip lever roller engaging the head of the pitman acts simply as a guide to compel the latter to move almost wholly in the direction of its length and said roller as it attains a position about vertically over the axle of the front wheels, rolls into the pocket 50 and commences to impose a direct endwise thrust on the pitman, the other trip lever roller hereinbefore referred to, at the same time riding off the front end of the tread surface of swing arm 43. The continued movement of the sweep results in the completion of the power stroke of the plunger, the pitman just before such stroke is completed coming into engagement with the trip-off lug 86 of collar 57 whereby the lateral movement of its front end is arrested so as to permit the engaging roller to ride out of its pocket. As this occurs the contraction of spring 58 with the usual tendency of the plunger to recoil, effects the recoil of the latter and the pitman to its original position, as shown in Fig. 2, this return of the pitman also through the connecting links 47 returning the swing arm 43 to its original position, it being noted in this connection that the pocket 45 of said swing arm is provided to permit said swing arm to attain its original position without striking the roller which shortly before had ridden off the front end of its tread surface.

As the pitman and its connections attain their original positions the parts are in their original positions except that the sweep has made one-third of a revolution, a different roller 36 is in engagement with the pocket of the lever or trigger and the third or formerly inoperative trip lever roller is in engagement with the inner side of the pitman head, the roller which before engaged the pitman head being now disposed between the pitman and the swing arm 43 for the purpose of engaging the tread surface of the latter as the sweep makes the second step in its revolution. It will thus be seen that the feeder and plunger perform their functions alternately and that each makes three operations for each revolution of the sweep. For the purpose of guarding against injury to the feeder mechanism in the event that an overcharge of hay is placed in the hopper or in the event of the feeder being prevented from making its full down stroke at any time and from any cause, the spring 84 will yield and permit the lever or trigger 77 to operate prematurely, that is to say, to be operated by the pressure on the engaging roller 36 without the usual full forward swing of swing arm 69, as will be readily understood, it being noted that the pin 79 operating in slot 80 prevents any undue movement of said lever or trigger. Reference to the detail operation of the brake mechanism is omitted as the same is common and well known in the art—in fact the automatic feeder with its premature release mechanism is also old, applicant's claims in this connection being to the modified construction of said parts and of the parts of the power mechanism.

From the above description it will be apparent that I have produced a baling press possessing the features of advantage enumerated as desirable and I wish it to be understood that I do not desire to be restricted to the exact details of construction shown, as obvious modifications will suggest themselves to one skilled in the art.

Having thus described the invention what I claim as new and desire to secure by Letters Patent, is:—

1. In a baling press, a goose-neck, a U-frame carried by and projecting laterally from the goose-neck, a vertical power-shaft journaled in the goose-neck and provided with a triple-arm trip-lever arranged to operate through the goose-neck and the U-frame, a pitman disposed in the horizontal plane of and adapted to be successively engaged by the arms of the trip-lever and to occupy a position at the opposite side of the latter from the U-frame when ready to make a power stroke, a swing-arm arranged in the horizontal plane of the trip-lever and pivoted at its outer end to and within the U-frame and provided with a tread-surface at its free end disposed toward the pitman, a link pivotally connecting the free end of the swing-arm with the pitman to compel the latter to make the preliminary portion of its power stroke when a trip-lever arm is engaged with the tread-surface of the swing-arm, and to swing the swing-arm toward the power-shaft when the recoil of the pitman takes place; said swing-arm having a pocket 45 between its tread-surface and pivoted end to receive each trip-lever arm as the same clears said tread-surface, to prevent said swing-arm in its return movement, from striking said trip-lever arm and also to permit the former to swing in close to the power shaft.

2. The combination in a baling press of a power shaft having a sweep head at its upper end provided with three rollers at equal distances from each other and from the axis of the shaft, a yoke at one side of the power shaft, a shelf carried by said yoke, a swing arm having its axis of movement coincidental with that of the power shaft and resting on said shelf and provided with an apertured lug, a lever or trigger pivoted on said swing arm and provided with a pocket at its inner end in the circular path of travel of said rollers, a bolt carried by the lever or trigger at the opposite side of its pivotal point from the pocket and extending rearwardly through the apertured lug of the swing arm, an expansive spring mounted on said bolt and bearing at its front end against said lug and bearing against said bolt to hold the trigger yieldingly in the path of said rollers, a spring-elevated feeder mounted on the baling case of the machine, a flexible connection suitably guided, between said feeder and the swing arm to insure synchronous movement of said parts, a bolt supported slidingly from said shelf in the path of movement of the swing arm, and a spring pressing said bolt toward the swing arm and adapted to cushion the impact of the swing arm on said bolt.

3. The combination in a baling press of a power shaft having a sweep head at its upper end provided with three rollers at equal distances from each other and from the axis of the shaft, a yoke at one side of the power shaft, a shelf carried by said yoke, a swing arm having its axis of movement coincidental with that of the power shaft and resting on said shelf and provided with an apertured lug and with a slot, a lever or trigger pivoted on said swing arm and provided with a pocket at its inner end in the circular path of travel of said rollers and with a pin depending through said slot, a bolt carried by the lever or trigger at the opposite side of its pivotal point from the pocket and extending rearwardly through the apertured lug of the swing arm, an expansive spring mounted on said bolt and bearing at its front end against said lug and bearing against said bolt to hold the trigger yieldingly in the path of said rollers, a spring elevated feeder mounted on the baling case of the machine, a flexible connection, suitably guided, between said feeder and the swing arm to insure synchronous movement of said parts, a bolt supported slidingly from said table in the path of movement of the swing arm, and a spring pressing said bolt toward the swing arm and adapted to cushion the impact of the swing arm on said bolt.

In testimony whereof I affix my signature, in the presence of two witnesses.

CHARLES L. COOKSON.

Witnesses:
   H. C. RODGERS,
   G. Y. THORPE.